United States Patent
Putz et al.

[11] Patent Number: 5,980,727
[45] Date of Patent: Nov. 9, 1999

[54] METHOD AND EQUIPMENT FOR REMOVING ORGANIC HALOGEN COMPOUNDS FROM WATER

[76] Inventors: Leo Putz; Christian Putz, both of Leo-Putz-Weg 1, 82131 Gauting; Reinhard Witt, Alter Kirchweg 1, 53562 St. Katharinen, all of Germany

[21] Appl. No.: 08/926,978

[22] Filed: Sep. 10, 1997

[30] Foreign Application Priority Data

Sep. 10, 1996 [DE] Germany .......................... 196 36 740

[51] Int. Cl.⁶ .................................................. C02F 1/461
[52] U.S. Cl. ........................ 205/688; 205/742; 205/743; 205/745; 205/751; 204/228.6; 204/242; 204/275
[58] Field of Search .................................... 205/688, 742, 205/743, 745, 751; 204/228, 242, 275, 228.6

[56] References Cited

U.S. PATENT DOCUMENTS

| | | | |
|---|---|---|---|
| 4,250,126 | 2/1981 | Yates | 205/746 |
| 4,585,533 | 4/1986 | Habeeb | 205/751 |
| 5,292,409 | 3/1994 | Dixon et al. | 205/742 |

*Primary Examiner*—Arun S. Phasge
*Attorney, Agent, or Firm*—Bacon & Thomas

[57] ABSTRACT

The present invention relates to a method to at least extensively remove organic halogen compounds from water or an aqueous solution, at least one magnesium or aluminum anode (1) and at least one associated electrode (2) operating as the cathode dipping into the water. The present invention also concerns equipment with which to implement the method of the invention. Both the method of the invention and the equipment of the invention are preferentially used when disinfecting water with chlorine and in particular in swimming pools.

20 Claims, 2 Drawing Sheets

METHOD AND EQUIPMENT FOR REMOVING ORGANIC HALOGEN COMPOUNDS FROM WATER

The present invention concerns a method for removing organic halogen compounds from water or from an aqueous solution and; further equipment for carrying out the method of the invention, also the application of the equipment of the invention in disinfecting drinking water, rainwater, swimming-pool water, industrial water and waste water using chlorine.

A frequently used procedure for treating drinking, bathing, industrial or waste water is by chlorination. Chlorination on one hand serves to disinfect or kill the germs in water and on the other hand to oxidize undesired admixtures, for instance organic substances contained in the water. Either elemental chlorine or chlorine compounds releasing chlorine are used in chlorination.

The chlorination of drinking or bathing water mainly is used to kill germs and pathogens. In the procedure of chlorination, the chlorine gas or the chlorine compounds are directly or indirectly fed into the water, that is, in the form of a previously prepared solution.

Mainly the germicidal effect of chlorine is based on the hypochlorous acid formed in the water as a function of the water's pH value and temperature. The following chemical reaction takes place when the chlorine dissolves in the water:

$$Cl_2 + H_2O \rightleftharpoons HOCl + H^+ + Cl^-.$$

Moreover the generated weakly hypochlorous acid HOCl ($pK_s=7.5$) increasingly dissociates as the pH value rises while forming hypochlorite ions ClO⁻ which also contribute to disinfection, even if slightly. The dissociation takes place according to the following chemical reaction:

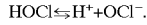
$$HOCl \rightleftharpoons H^+ + OCl^-.$$

Further disinfectants allowed under drinking water regulations are the hypochlorites of sodium, calcium and magnesium, chloride of lime, chlorine dioxide and ozone. Except for ozone, all admissible disinfectants are chlorinous.

However these disinfecting procedures using chlorinous substances incur the substantial drawback that organic chlorine products are generated as byproducts during the chlorination of water containing organic contaminants. Most of these byproducts are toxic and highly damaging to health.

Predominantly significant among the organic halogen compounds (halogen-organic compounds or organohalogens) are the halogen hydrocarbons. These substances include among many others the carcinogenically classified trichloromethane (chloroform), trichloroethane, tetrachloroethane ("tetra", "per") as well as the polychlorinated biphenyls (PCB) and -terphenyls (PCT). These organohalogen compounds are among the most objectionable materials dealt with in water supplies in general and in particular with respect to drinking water.

Because practically all these organic halogen compounds must be considered health-impairing, the water following its chlorination must be reliably free of organic halogen compounds.

Accordingly it is the object of the present invention to extensively remove organic halogen compounds from water.

This process-technology problem is solved by a method for removing organic halogen compounds from water or an aqueous solution, characterized in that the water or the aqueous solution undergoes the action of an electrode configuration composed of at least one anode made of a metal evincing a low standard potential and at least one cathode made of a metal having a standard potential higher than that of the anode metal and of an electrically conducting anode-cathode connection. The equipment-technology problem is solved by equipment for the implementation of the method as characterized in that it comprises a water container (5) holding chlorine-treated water or an aqueous solution, at least one magnesium or aluminum anode (1, 1' . . . ) and at least one associated electrode (2, 2' . . . ) acting as the cathode, the electrodes (1, 1' . . . ; 2, 2' . . . ) dipping into the water or the aqueous solution. Lastly the problem is also solved by the use of the equipment to disinfect drinking water, rainwater, swimming-pool water, industrial water and waste water by means of chlorine.

The invention extensively removes organic halogen compounds from water or from an aqueous solution in that at least one magnesium or aluminum anode is placed in the water together with at least one associated electrode operating as a cathode.

The anode is made of a comparatively base material having a relatively low standard potential and need not fully consist of magnesium or aluminum but also may contain additives of other materials or comprise a core of a mechanically stronger material. The anodes being used offer the advantage of being relatively economical.

The associated electrode or its surface preferably consists of a high-grade material having a larger standard potential than the anode so that a current may exist between the electrodes even in the absence of an external potential and magnesium or aluminum ions go into solution. The precise mechanism whereby the organic halogen compounds are removed or are converted into harmless products has not yet been determined.

However one of the above cited anode materials also may be used as the cathode material.

The current can be increased by applying a potential across the electrodes and more magnesium or aluminum ions will then be generated by the anode. This feature offers the advantage that higher concentrations of organic halogen compounds can be removed and/or that the organic halogen compounds can be removed more rapidly.

The applied potential is within the range of about 0.5 to 40 v, preferably about 0.5 to 20 v and in especially preferred manner between about 1 and 12 v and the current between the electrodes is about 100 to 1,000 ma, preferably about 200 to 800 ma and in especially preferred manner between about 400 and 600 ma. The current however also may substantially larger if the conductivity is sufficiently high.

The magnitude of the potential or current is determined by the application and the electrode material, however the applied potential shall overcome at least the standard potential between the electrodes.

Preferably the chlorine concentration in the water will be directly related to the potential or to the generated magnesium or aluminum ions so that on one hand the organic halogen compounds shall be extensively removed and on the other hand unnecessary consumption of magnesium or aluminum ions will be precluded.

When the method of the invention is carried out, a white precipitate is frequently observed in the water and/or at the cathode, the composition of said precipitate so far not having been determined.

Preferably an electrode made of iron, high-grade steel, platinum or gold is used as the associated electrode, the iron and high-grade steel electrodes being especially preferred on economic grounds, whereas gold, high-grade steel or platinum electrodes offer the advantage that an oxide layer will not form on the electrode surface when in contact with chlorinous water. Suitable high-grade steels in particular are V2A or V4A steels. In general all conducting or semiconducting materials not forming a closed oxide layer on the electrode surface may be used as cathodes because the cathode material does not go into solution.

The applied potential can be conveniently controlled or regulated by a control apparatus either feeding a constant potential or controlling or regulating the potential in relation to the chlorine concentration in the water and thereby preventing unnecessarily rapid wear of the magnesium or aluminum anode.

A continuous method is especially preferred and economical, wherein the chlorine concentration is measured by means of a chlorine sensor, in particular a chlorine electrode directly connected to the control apparatus, as a result of which the generated quantity of magnesium or aluminum ions corresponds to the particular chlorine concentration. The chlorine sensor also may be connected indirectly to the control apparatus by using an interface or a microprocessor.

Any water and any aqueous solution may be used in the method of the invention. However drinking water, rainwater, industrial water, swimming-pool water are preferred, being often subject to mandatory chlorination. Moreover the method of the invention also may be implemented on aqueous solution wastes of the chemical industry such as may accumulate following fluorination, bromination, chlorination or iodization with the elemental halogens.

The equipment of the invention comprises a container holding water or an aqueous solution and at least one magnesium or aluminum anode and at least one associated electrode functioning as a cathode, both anode and cathode being in contact with the water.

The equipment may include an alarm to emit a warning signal when the magnesium or aluminum anode has been almost entirely decomposed and must be renewed. This feature allows preventing the equipment from operating further until the anode is completely used up, i.e. preventing a higher current from arising meantime.

The equipment of the invention is preferably used in chlorine disinfection of drinking water, rainwater, swimming-pool water, industrial water or waste water. An especially preferred range of applications concerns the production of drinking or industrial water from rainwater which as a rule still contains organic substances (for instance leaves, microorganisms, moss particles etc.) and also the disinfection of swimming-pool water.

Another application when chlorinating waste waters is the elimination of odoriferous or rotting materials, whereby organic halogen compounds also may be generated in substantial quantities.

An especially preferred range of applications concerns the use of the equipment of the invention in swimming pools which are exposed to intense introduction of organic substances, for instance leaves, dead insects, sunscreen oils etc., and thus to especially high danger of generating organic halogen compounds when the water is treated with chlorine.

BRIEF DESCRIPTION OF THE DRAWINGS

Further advantages and features of the invention are elucidated below in the description of illustrative embodiments and in relation to the drawing.

EXAMPLE 1

Swimming-pool Equipment

Figure 1:
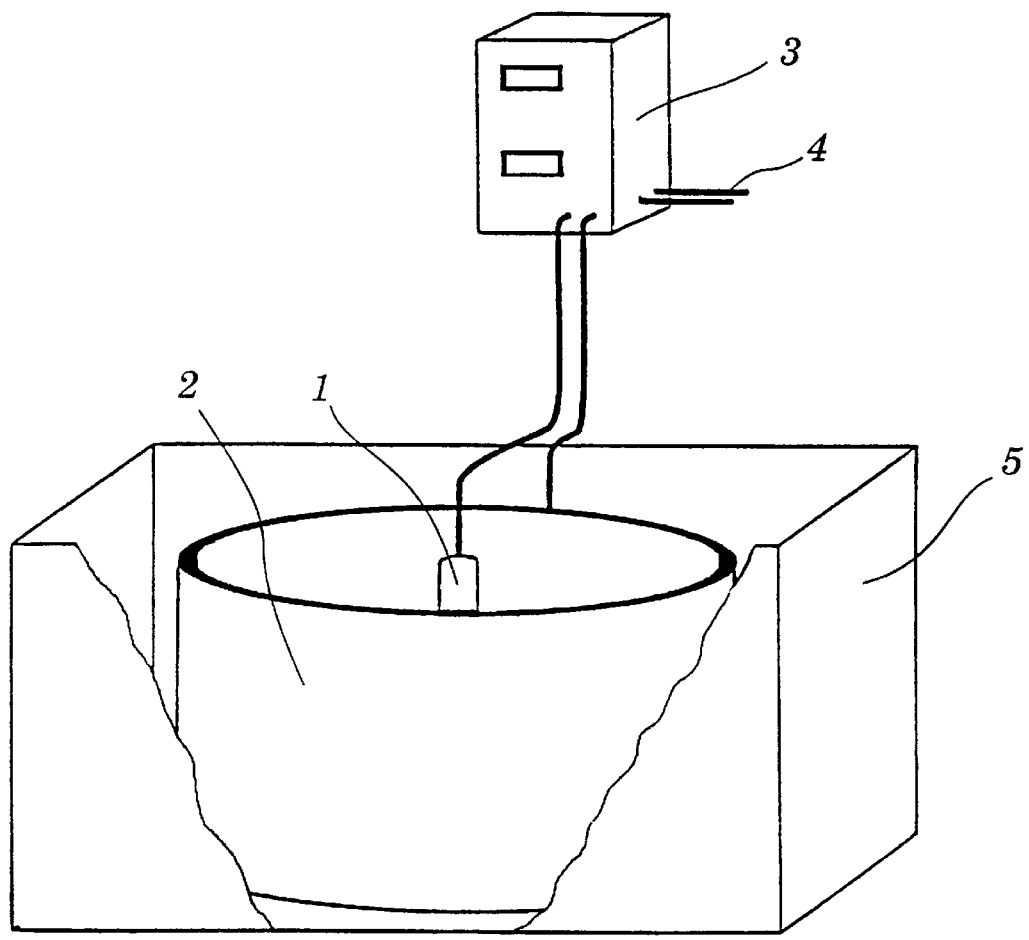
FIG. 1 shows equipment to carry out the method of the invention.

The equipment for extensively removing organic halogen compounds shown in FIG. 1 is composed of a bar-shaped magnesium anode 1 and of an associated electrode 2 in the form of an iron tube, both electrodes dipping into the water mixed with a chlorine solution in a container 5.

The magnesium electrode 1 mounted at the center of the water container and acting as anode and the annular iron electrode 2 acting as cathode and connected to each other by a control apparatus 3, generate an electric field wherein the generated magnesium ions migrate toward the iron cathode 2. The energy of 7.61 ev per atom required to ionize the magnesium atoms is delivered by the control apparatus 3 of which the outputs are connected respectively to the anode 1 and cathode 2. Hydrogen ions are discharged in particular at the cathode to balance the charges.

To assure that sufficient $Mg^{++}$ shall always be in solution, the control apparatus 3 is fitted with an input 4 to which is applied a potential corresponding to the chlorine concentration and controlling the output current and thereby controlling the formation of magnesium ions. In this example the preferred potential is about 2 v, the preferred current about 400 ma. In a swimming pool the voltage should not exceed a value of about 4 v because higher values may affect the swimmers.

Once the magnesium electrodes have been almost completely decomposed, an alarm, which may be in the form of a warning light or a warning buzzer, and a control output shall be activated, by means of which the water disinfecting equipment and/or components thereof may be shut down.

EXAMPLE 2

Rainwater Disinfection Equipment

Illustrative equipment used to disinfect rainwater comprises two aluminum diodes and one platinum cathode dipping into a container holding rainwater collected from a home gutter and previously filtered. Using platinum for the associated electrode offers the advantage that no oxide layer shall be formed on the electrode surface making contact with chlorinous water. Following chlorination of the rainwater with 1% $Cl_2$ solution, a potential of about 12 v is applied across the electrodes. The current between the electrodes is about 600 ma in this example. The organic halogen compounds generated during chlorination are removed in such manner that the chlorine-disinfected rainwater can be used as drinking water.

EXAMPLE 3

Removing Monochloromethane

The removal of monochloromethane from the water of a swimming pool was measured in equipment comprising a magnesium anode and an iron cathode.

The content of monochloromethane decreased slowly but continuously when the electrodes free of any applied potential were dipped into a container holding 50 ltr of swimming-pool water. Monochloromethane no longer could be detected after 24 h.

When a potential of 3v was applied across the electrodes dipping into a container holding 50 ltr of swimming-pool water, monochloromethane could no longer be detected after 2 h.

This example graphically demonstrates that the removal of organic halogen compounds can be significantly accelerated by applying a potential.

Removal of trichloromethane:

Trichloromethane was removed in similar manner from swimming-pool water initially, that is before the treatment of the invention, 21 μg/ltr trichloromethane. Following the above described treatment at 3v and using a pair of magnesium/iron electrodes, less than 0.5 μg/ltr trichloromethane, and when using an aluminum/iron pair of electrodes less than 3.1 μg/ltr trichloromethane, could still be detected.

Figure 2:
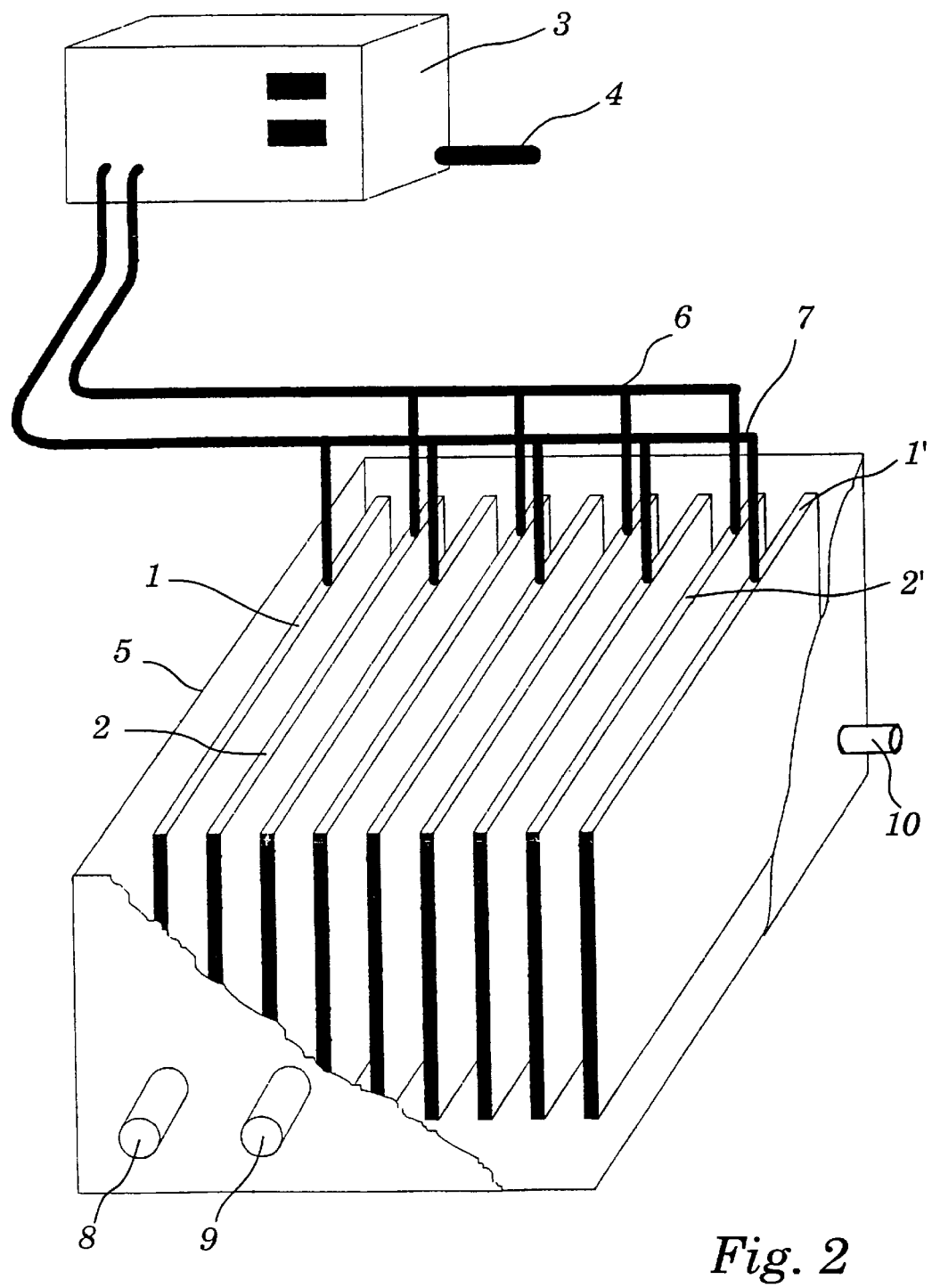
FIG. 2 shows another embodiment of equipment of the invention.

The equipment shown in FIG. 2 comprises several equidistant parallel anode plates 1, 1' . . . and cathode plates 2, 2' . . . in a container 5. The anode and cathode plates are configured alternatingly in such manner that a cathode plate 2, 2' . . . is present between two anode plates 1, 1' . . . These plates are fitted with appropriately polarized current feeds 6, 7 that may be connected to a control apparatus 3 of the above described species. In such a case the input 4 of the control apparatus 3 is connected to an appropriate power source.

The anode and cathode plates furthermore may be replaced by wire meshes or bar lattices. In this case the anode shall consist of lattice rods of relatively large diameter, for instance 3 to 15 mm in order that there be sufficient anode material for extended operation. In this instance the cathode may consist of a fine-mesh wire sieve, in particular when using a noble metal cathode. In this manner a large electrode surface can be achieved using only little noble metal.

Obviously the container 5 comprises intake and outlet stubs 8, 9, 10. These stubs may be mounted parallel to one end face of the container 5 or they may be mounted at an angle to each other at adjacent container walls or be located at mutually opposite walls.

Advantageously deflecting baffles are present in the container 5 to assure good contact between the liquid being treated and the electrodes.

We claim:

1. A method for removing organic halogen compounds from water or an aqueous solution, comprising the steps of arranging an electrode configuration in said water or said aqueous solution, said electrode configuration comprising at least one anode made of a metal having a low standard potential and at least one cathode made of a metal having a standard potential higher than that of the anode metal and an electrically conducting anode-cathode connection, applying an electrical potential across said electrodes, and controlling or regulating said electrical potential in relation to the halogen concentration in said water or said aqueous solution by means of a control apparatus and thereby removing said organic halogen compounds from said water or aqueous solution.

2. A method as claimed in claim 1, wherein the anode metal is magnesium, aluminum, zinc or tin.

3. A method as claimed in claim 1, wherein said electrical potential is higher than the standard potential of the anode metal, the anode metals also being appropriate for the cathode.

4. A method as claimed in claim 3, wherein the magnitude of the applied potential is between approximately 0.5 and 40 v.

5. A method as claimed in claim 3, wherein the magnitude of the applied potential is between approximately 0.5 and 20 v.

6. A method as claimed in claim 3, wherein the magnitude of the applied potential is between approximately 1 and 12 v.

7. A method as claimed in claim 1, wherein the cathode is an iron, high-grade steel, gold or platinum electrode.

8. A method as claimed in claim 7, wherein the anode metal is magnesium, aluminum, zinc or tin.

9. A method as claimed in claim 1, wherein said applied potential is regulated in relation to the chlorine concentration in the water.

10. A method as claimed in claim 9, wherein the chlorine concentration is determined using a chlorine sensor, and in that said concentration is continuously relayed to an input of a control apparatus.

11. A method as claimed in claim 1, wherein said organic halogen compounds are formed by chlorination of water, the water being selected from the group consisting of drinking water, rainwater, swimming-pool water, industrial water and waste water.

12. Equipment for removing organic halogen compounds from water or an aqueous solution comprising a water container (5) holding chlorine-treated water or an aqueous solution, at least one magnesium or aluminum anode (1, 1' . . . ) and at least one associated electrode (2, 2' . . . ) acting as the cathode, the electrodes (1, 1' . . . ; 2, 2' . . . ) dipping into the water or the aqueous solution, means for applying an electrical potential across said electrodes, a control apparatus connected to said electrodes, and sensor means for determining a halogen concentration in said water or said aqueous solution.

13. The equipment as claimed in claim 12, wherein said applied potential amounts to approximately 0.5 to 40 v.

14. The equipment as claimed in claim 13, wherein said applied potential amounts to approximately 1 to 12 v.

15. The equipment as claimed in claim 13, wherein said associated electrode (2, 2' . . .) also is made of magnesium, aluminum, iron, high-grade steel, gold or platinum.

16. The equipment as claimed in claim 13, wherein said sensor means comprise a chlorine sensor, said sensor determining the chlorine concentration in the water or in the aqueous solution and continuously relaying it to an input (4) of the control apparatus (3).

17. The equipment as claimed in claim 13, wherein the sensor is a chlorine electrode.

18. The equipment as claimed in claim 13, which further comprises an alarm emitting a signal when the anode (1, 1' . . .) is almost entirely consumed and must be replaced.

19. The equipment as claimed in claim 13, characterized in that the electrodes are plates, several anode plates (1, 1' . . . ) and cathode plates (2, 2' . . . ) being parallel and equidistant and configured alternatingly inside the container (5).

20. The equipment as claimed in claim 12, wherein said applied potential amounts to approximately 0.5 to 20 v.

* * * * *